US012160324B2

(12) United States Patent
Norman et al.

(10) Patent No.: US 12,160,324 B2
(45) Date of Patent: Dec. 3, 2024

(54) DATA COLLECTION AND ANALYSIS FOR MANAGING AND MAINTAINING BUILDINGS

(71) Applicant: MEI Venture I, LLC, Atlanta, GA (US)

(72) Inventors: Matt Norman, Snellville, GA (US); Lloyd Anders, Raleigh, NY (US)

(73) Assignee: MEI Venture I, LLC, Atlanta, GA (US)

( * ) Notice: Subject to any disclaimer, the term of this patent is extended or adjusted under 35 U.S.C. 154(b) by 678 days.

(21) Appl. No.: 17/324,754

(22) Filed: May 19, 2021

(65) Prior Publication Data

US 2022/0376940 A1     Nov. 24, 2022

(51) Int. Cl.
| | |
|---|---|
| G05B 15/02 | (2006.01) |
| G05B 19/048 | (2006.01) |
| G05B 23/02 | (2006.01) |
| H04L 12/28 | (2006.01) |
| G05B 19/042 | (2006.01) |

(52) U.S. Cl.
CPC ............ *H04L 12/283* (2013.01); *G05B 15/02* (2013.01); *G05B 19/0428* (2013.01); *G05B 19/048* (2013.01); *G05B 23/02* (2013.01); *G05B 23/0205* (2013.01); *G05B 23/0218* (2013.01); *G05B 23/0227* (2013.01); *G05B 23/0235* (2013.01); *G05B 23/024* (2013.01); *G05B 2219/2614* (2013.01); *G05B 2219/2642* (2013.01); *H04L 12/2816* (2013.01)

(58) Field of Classification Search
CPC ... H04L 12/283; H04L 12/2816; G05B 15/02; G05B 2219/2642; G05B 19/0428; G05B 2219/2614; G05B 19/048; G05B 23/02; G05B 23/0205; G05B 23/0218; G05B 23/024; G05B 23/0227; G05B 23/0235
See application file for complete search history.

(56) References Cited

U.S. PATENT DOCUMENTS

| | | | | |
|---|---|---|---|---|
| 2004/0102924 | A1* | 5/2004 | Jarrell | G06Q 10/04 |
| | | | | 702/181 |
| 2009/0132091 | A1* | 5/2009 | Chambers | G06F 1/32 |
| | | | | 700/276 |
| 2012/0056746 | A1* | 3/2012 | Kaigler | A61B 5/0022 |
| | | | | 702/19 |

(Continued)

*Primary Examiner* — Manish S Shah
*Assistant Examiner* — Christian T Bryant
(74) *Attorney, Agent, or Firm* — Georgiy L. Khayet

(57) ABSTRACT

Methods and systems for collecting and analyzing data for managing and maintaining buildings are provided. An example method commences with collecting a plurality of data points from a plurality of equipment pieces associated with at least one building. The plurality of data points are associated with an operation of the plurality of equipment pieces. The method continues with analyzing the plurality of data points based on predetermined criteria. The analysis includes determining whether one or more rules of a plurality of rules are met by the plurality of equipment pieces. The method further includes determining, based on the analysis, that one or more equipment pieces of the plurality of equipment pieces do not meet the one or more rules. The method then continues with generating an alert associated with the one or more equipment pieces based on the determination that the one or more rules are not met.

19 Claims, 12 Drawing Sheets

(56) References Cited

U.S. PATENT DOCUMENTS

| | | | |
|---|---|---|---|
| 2014/0006660 A1* | 1/2014 | Frei | H04L 43/10 |
| | | | 710/104 |
| 2014/0058572 A1* | 2/2014 | Stein | G06Q 50/06 |
| | | | 700/291 |
| 2016/0217674 A1* | 7/2016 | Stewart | F24F 11/38 |
| 2019/0107304 A1* | 4/2019 | Blair | F24F 11/38 |
| 2019/0302157 A1* | 10/2019 | Vitullo | G01K 17/20 |
| 2020/0225654 A1* | 7/2020 | Vitullo | G05B 23/0235 |

* cited by examiner

| Rules > | | | | | | | |
|---|---|---|---|---|---|---|---|
| Device | Weight | Airflow not meeting setpoint | Damper stuck open | Damper stuck closed | Airflow < Airflow min | Damper always > 90% |
| Device 1 | 3 | 0.0% | 0.0% | 79.2% | 100% | 79.2% |
| Device 2 | 3 | 100% | 0.0% | 0.0% | 100% | 100% |
| Device 3 | 2 | 100% | 16.7% | 0.0% | 0.0% | 0.0% |
| Device 4 | 2 | 29.2% | 0.0% | 0.0% | 66.7% | 79.2% |
| Device 5 | 2 | 83.3% | 100% | 0.0% | 0.0% | 0.0% |
| Device 6 | 2 | 100% | 0.0% | 0.0% | 0.0% | 0.0% |
| Device 7 | 2 | 100% | 0.0% | 0.0% | 0.0% | 100% |
| Device 8 | 2 | 25.0% | 100% | 0.0% | 0.0% | 100% |
| Device 9 | 2 | 100% | 0.0% | 0.0% | 0.0% | 0.0% |
| Device 10 | 2 | 75% | 0.0% | 0.0% | 100% | 0.0% |
| Device 11 | 1 | 100% | 0.0% | 0.0% | 100% | 0.0% |
| Device 12 | 1 | 100% | 0.0% | 0.0% | 0.0% | 0.0% |
| Device 13 | 1 | 0.0% | 0.0% | 0.0% | 0.0% | 0.0% |
| Device 14 | 1 | 0.0% | 0.0% | 0.0% | 0.0% | 0.0% |

FIG. 3

| Rules > | | | | | | | |
|---|---|---|---|---|---|---|---|
| Device Name | Weight | Airflow not meeting setpoint | Damper stuck open | Damper stuck closed | Airflow < Airflow min | Damper always > 90% |
| Device 12 | 1 | 0.0% | 0.0% | 0.0% | 100% | 0.0% |
| Device 15 | 1 | 0.0% | 0.0% | 0.0% | 100% | 0.0% |
| Device 16 | 1 | 0.0% | 0.0% | 0.0% | 100% | 0.0% |
| Device 20 | 1 | 0.0% | 0.0% | 0.0% | 100% | 0.0% |
| Device 17 | 1 | 0.0% | 0.0% | 0.0% | 100% | 0.0% |
| Device 21 | 1 | 0.0% | 0.0% | 0.0% | 100% | 0.0% |
| Device 1 | 3 | 0.0% | 0.0% | 79.2% | 100% | 79.2 |
| Device 22 | 1 | 0.0% | 0.0% | 0.0% | 100% | 0.0% |
| Device 19 | 1 | 0.0% | 0.0% | 0.0% | 100% | 0.0% |
| Device 11 | 1 | 0.0% | 0.0% | 0.0% | 100% | 0.0% |
| Device 10 | 2 | 0.0% | 0.0% | 0.0% | 100% | 0.0% |
| Device 12 | 1 | 0.0% | 0.0% | 0.0% | 100% | 0.0% |
| Device 13 | 1 | 0.0% | 0.0% | 0.0% | 100% | 0.0% |
| Device 14 | 1 | 0.0% | 0.0% | 0.0% | 100% | 0.0% |

*FIG. 4*

| Rules > | | | | | | | |
|---|---|---|---|---|---|---|---|
| Device Name | Weight | Airflow not meeting setpoint | Damper stuck open | Damper stuck closed | Airflow < Airflow min | Damper always > 90% |
| Device 1 | 3 | 0.0% | 0.0% | 79.2% | 100% | 79.2% |
| Device 2 | 3 | 100% | 16.7% | 0.0% | 100% | 100% |
| Device 3 | 2 | 100% | 0.0% | 0.0% | 66.7% | 0.0% |
| Device 4 | 2 | 29.2% | 100% | 0.0% | 0.0% | 79.2% |
| Device 5 | 2 | 83.3% | 0.0% | 0.0% | 0.0% | 0.0% |
| Device 6 | 2 | 100% | 100% | 0.0% | 0.0% | 100% |
| Device 7 | 2 | 100% | 0.0% | 0.0% | 0.0% | 100% |
| Device 8 | 2 | 25.0% | 100% | 0.0% | 0.0% | 0.0% |
| Device 9 | 2 | 100% | 0.0% | 0.0% | 100% | 0.0% |
| Device 10 | 2 | 75% | 0.0% | 0.0% | 100% | 0.0% |
| Device 11 | 1 | 100% | 0.0% | 0.0% | 100% | 0.0% |
| Device 12 | 1 | 100% | 0.0% | 0.0% | 0.0% | 0.0% |
| Device 13 | 1 | 0.0% | 0.0% | 0.0% | 0.0% | 0.0% |
| Device 14 | 1 | 0.0% | 0.0% | 0.0% | 0.0% | 0.0% |

*FIG. 5*

Formulas for "Airflow not meeting setpoint" rule

| Type | Require? | Name | Formula | Note |
|---|---|---|---|---|
| Variable | | During day? | HOUR(Date/Time)>=6 and HOUR(Date/Time)<20 | |
| Variable | ✓ | Airflow | getPoint(Device,"Airflow") | Airflow read by Device N |
| Rule Flag Condition | | Airflow not meeting setpoint | ABS(Airflow-Airflow Setpoint)>150 | |
| Variable | ✓ | Airflow setpoint | getPoint(Device, "Airflow Setpoint") | |
| Precondition | | During workday? | During work week? and HOUR(Date/Time)>=8 and <=17 | |
| Variable | | During work week? | Weekday(Date/Time)>=1 and Weekday(Date/Time)<=5 | |
| Preloaded | | This data | Date(Date/Time) | The date under analysis |
| Preloaded | | This Time | Time(Date/Time) | The time under analysis |
| Preloaded | | This Hour | Hour(Date/Time) | The hour under analysis |

*FIG. 7*

| Equipment Pieces | |
|---|---|
| ∨ Equipment Tree | (0/550) |
| ☐ Equipment folder 1 | (0/52) |
| ☐ Equipment folder 2 | (0/48) |
| ☐ Equipment folder 3 | (0/42) |
| ☐ Equipment folder 4 | (0/57) |
| ∨ Equipment Types | (0/779) |
| ☐ Equipment type 1 | (0/52) |
| ☐ Equipment type 2 | (0/47) |
| ☐ Equipment type 3 | (0/42) |
| ☐ Equipment Components | (0/352) |

*FIG. 8*

Air handling unit 910

Profile data points 915

| Name | Description | Units |
|---|---|---|
| Supply air temperature | | Temperature (deg F) |
| Returning temperature | | Temperature (deg F) |
| Maximum temperature | | Temperature (deg F) |

Subprofile data points 920

| Name | Base profile | Description |
|---|---|---|
| Chilled water coil | Chilled water coil | |
| Temperature with setpoint | Temp sensor with setpoint | |
| Returning temperature | Temp sensor | |
| Maximum temperature | Temp sensor | |
| Supply fan | Fan profile | |
| Leaving fan | Fan profile | |

*FIG. 9*

DATA COLLECTION AND ANALYSIS FOR MANAGING AND MAINTAINING BUILDINGS

TECHNICAL FIELD

This disclosure generally relates to the data processing. More particularly, this disclosure relates to methods and systems for collecting and analyzing data for managing and maintaining buildings.

BACKGROUND

Heating, ventilation, and air conditioning (HVAC) systems are used to provide thermal comfort and air quality inside buildings. The HVAC systems are normally monitored and controlled by operators, which can be time- and effort-consuming. Furthermore, even though the HVAC systems can collect data related to operation of HVAC equipment, these data are typically stored to a database such that the operators do not have access to a real-time view of operation of the equipment. Additionally, the HVAC systems may collect data in a machine-readable format that cannot be easily read by operators. Thus, traditionally, in order to review operations of the equipment, operators perform conversions of the data into a format more suitable for review.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for collecting and analyzing data for managing and maintaining buildings. According to an example embodiment, a system for collecting and analyzing data for managing and maintaining buildings is provided. The system may include a data collection module, an analyzing module, and an alert generation module. The data collection module may be configured to collect a plurality of data points from a plurality of equipment pieces associated with at least one building. The plurality of data points may be associated with an operation of the plurality of equipment pieces. The data analyzing module may be configured to analyze the plurality of data points based on predetermined criteria. The analysis may include determining whether one or more rules of a plurality of rules are met by the plurality of equipment pieces. Based on the analysis, the data analyzing module may determine that one or more equipment pieces of the plurality of equipment pieces do not meet the one or more rules. Based on the determining that the one or more equipment pieces do not meet the one or more rules, the alert generation module may generate an alert associated with the one or more equipment pieces.

According to another aspect of the disclosure, a method for collecting and analyzing data for managing and maintaining buildings is provided. The method may commence with collecting a plurality of data points from a plurality of equipment pieces associated with at least one building. The plurality of data points may be associated with an operation of the plurality of equipment pieces. The method may continue with analyzing the plurality of data points based on predetermined criteria. The analysis may include determining whether one or more rules of a plurality of rules are met by the plurality of equipment pieces. The method may further include determining, based on the analysis, that one or more equipment pieces of the plurality of equipment pieces do not meet the one or more rules. The method may continue with generating an alert associated with the one or more equipment pieces based on the determination that the one or more equipment pieces of the plurality of equipment pieces do not meet the one or more rules.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 3 is a schematic diagram showing a user interface that visualizes an operation of a plurality of equipment pieces over a period of time, according to an example embodiment.

FIG. 4 is a schematic diagram showing a user interface that visualizes an operation of a plurality of equipment pieces over a period of time, according to an example embodiment.

FIG. 5 is a schematic diagram showing a user interface that visualizes an operation of a plurality of equipment pieces over a period of time, according to an example embodiment.

FIG. 7 is a schematic diagram showing a user interface that illustrates formulas applied in setting rules for equipment pieces, according to an example embodiment.

FIG. 8 is a schematic diagram showing a user interface that enables selection of equipment pieces, according to an example embodiment.

FIG. 9 is a schematic diagram showing a user interface that illustrates translation of parameters for one or more equipment pieces into parameters groups of equipment pieces or components of equipment pieces, according to an example embodiment

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein relates to systems and methods for collecting and analyzing data for managing and maintaining buildings. An example system for collecting and analyzing data for managing and maintaining buildings may provide a data analytics solution for building information coming from a HVAC system of a building. The system may ingest information related to operation of equipment received from the building, analyze the collected information, and provide recommendations for repairing and/or optimizing the operation of the equipment in the building.

The system may include a data collection module that collects data points from equipment pieces of a building. Data points may include parameters associated with an operation of the equipment pieces over a period of time. A data analyzing module of the system may analyze the collected data points based on predetermined criteria to determine whether the equipment pieces meet rules. The rules may be predetermined for each equipment piece or group of equipment pieces. Based on the analysis, the data analyzing module may determine whether one or more equipment pieces broke one or more of the rules. Based on the determination that the one or more equipment pieces broke the one or more of the rules, an alert generation module may generate an alert associated with the one or more equipment pieces. The data analyzing module may further select a mitigation action to make the one or more equipment pieces meet the one or more rules.

Figure 1:
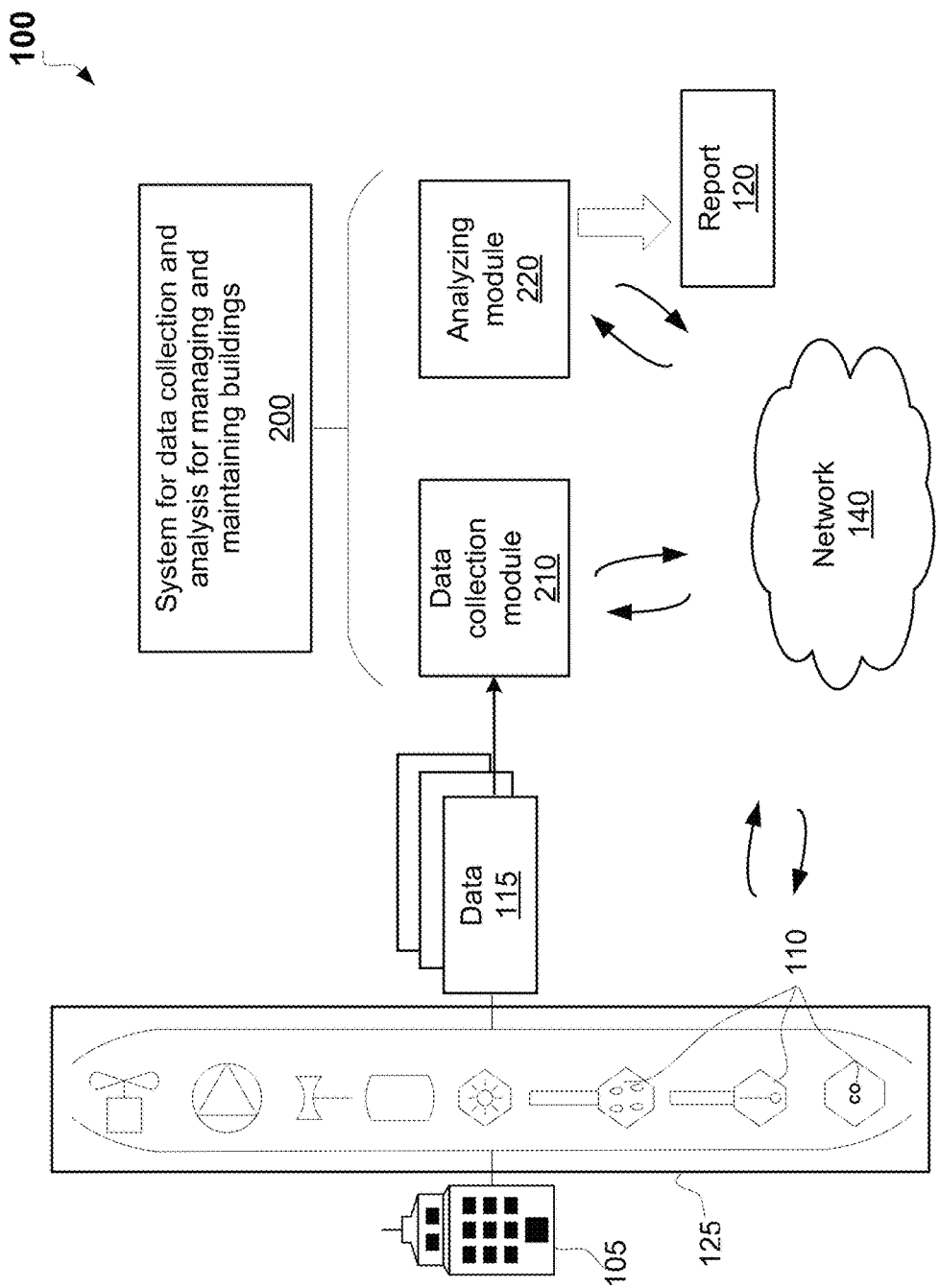
FIG. 1 is a block diagram showing an example environment, in which a system and a method for collecting and analyzing data for managing and maintaining buildings can be implemented.

Referring now to the drawings, FIG. 1 shows an example environment 100, in which a system and a method for collecting and analyzing data for managing and maintaining buildings can be implemented. The environment 100 may include a building 105, a plurality of equipment pieces 110 associated with the building 105, a system 200 for collecting and analyzing data for managing and maintaining buildings, and a data network 140. The building 105 may include a one-story building, a multi-story building, a plurality of buildings, and so forth. The plurality of equipment pieces 110 may include equipment installed and running in the building 105. The plurality of equipment pieces 110 may include HVAC equipment, water-supply equipment, pumps, valves, lighting equipment, sensors (such as temperature sensors, humidity sensors, air quality sensors, lighting sensors, and so forth), and any other equipment that provides thermal comfort, air quality, and water supply inside the building 105. In an example embodiment, the plurality of equipment pieces 110 may be controlled by an equipment control system 125 associated with the building 105. The equipment control system 125 may be located in the building 105 or may be running remotely, for example, on a server.

In an example embodiment, the system 200 may include any of a server, a cloud-based computing resource, an application running on a computing device, and so forth. The system 200 may have a data collection module 210 configured to collect data 115 from the plurality of equipment pieces 110. In an example embodiment, the data collection module 210 may receive the data 115 from the equipment control system 125. Specifically, the equipment control system 125 may collect the data 115 from the plurality of equipment pieces 110 and transmit the data 115 to the system 200. In an example embodiment, the equipment control system 125 may be configured in a form of a network device running in the building 105 and in communication with the plurality of equipment pieces 110.

Upon receiving the data 115, the data collection module 210 may provide the collected data 115 to an analyzing module 220 of the system 200. The analyzing module 220 may analyze the data 115 and generate a report 120 based on the analysis.

The system 200 may communicate with the equipment control system 125 and/or the plurality of equipment pieces 110 via the data network 140. In an example embodiment, the plurality of equipment pieces 110, the equipment control system 125, and all components of the system 200 may be connected to the data network 140. The data network 140 may include the Internet or any other network capable of communicating data between devices. Suitable networks may include or interface with any one or more of, for instance, a local intranet, a corporate data network, a data center network, a home data network, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications using the data network 140 may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
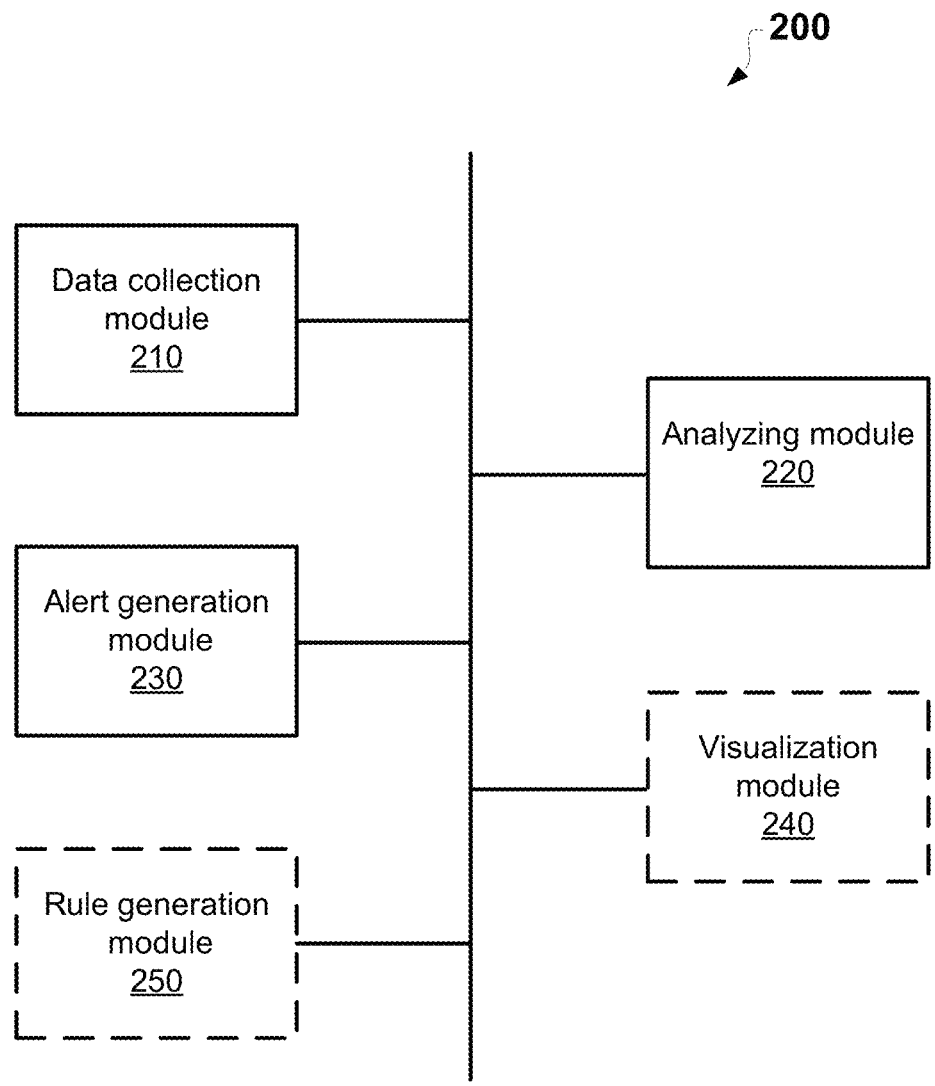
FIG. 2 is a block diagram showing modules of a system for collecting and analyzing data for managing and maintaining buildings, according to an example embodiment.

FIG. 2 is a block diagram showing modules of a system 200 for collecting and analyzing data for managing and maintaining buildings, according to an example embodiment. The system 200 may include a data collection module 210, an analyzing module 220, an alert generation module 230, and optionally a visualization module 240 and a rule generation module 250. In an example embodiment, the modules 210-250 can be implemented by one or more processors as processor-executable codes stored in a memory of the system 200.

The data collection module 210 may be configured to collect a plurality of data points from a plurality of equipment pieces associated with at least one building. The plurality of data points may be associated with an operation of the plurality of equipment pieces. The collection of the plurality of data points may include receiving one or more text files storing data associated with an operation of the plurality of equipment pieces at predetermined points of time. The data points may include parameters of the equipment pieces at predetermined points of time.

The analyzing module 220 may be configured to analyze the plurality of data points based on predetermined criteria. The analysis may include determining whether one or more rules of a plurality of rules are met by the plurality of equipment pieces. In an example embodiment, the plurality of rules may include predetermined parameters of operation or operation conditions associated with the equipment pieces. Based on the analysis, the analyzing module 220 may determine that one or more equipment pieces of the plurality of equipment pieces do not meet the one or more rules.

The determination that the one or more equipment pieces of the plurality of equipment pieces do not meet the one or more rules may include determining that one or more of the data points associated with the one or more equipment pieces are below a predetermined threshold. In some embodiments, it may be determined that the one or more equipment pieces do not meet the one or more rules based on historical data associated with the one or more equipment pieces.

Based on the determining that the one or more equipment pieces do not meet the one or more rules, the alert generation module 230 may generate an alert associated with the one or more equipment pieces.

In an example embodiment, the analyzing module 220 may be configured to select, based on the analysis, a mitigation action to make the one or more equipment pieces meet the one or more rules. The analyzing module 220 may be further configured to generate an analysis report showing results of the analysis.

In some example embodiments, the analyzing module 220 may be further configured to map the plurality of equipment pieces. The mapping may include assigning an equipment piece of the plurality of equipment pieces to an equipment component. In further example embodiments, the mapping may include assigning the data points associated with the equipment piece to the data points associated with the equipment component. Furthermore, the equipment piece may be assigned to a parent equipment piece or to a logical equipment group. The analyzing module 220 may be configured to cluster the one or more equipment pieces based on predetermined criteria.

The visualization module 240 may be configured to visualize an operation of the plurality of equipment pieces over a period of time. The visualization may include rendering set operation parameters associated with the plurality of equipment pieces and actual operation parameters associated with the plurality of equipment pieces. The actual operation parameters may be determined based on the data points collected at predetermined times during the period of time. The visualizing may further include showing a list of rules assigned to the one or more equipment pieces.

The rule generation module 250 may be configured to enable a user to perform at least one of the following: create the plurality of rules, edit the plurality of rules, enable one or more of the plurality of rules, disable the one or more of the plurality of rules, delete the one or more of the plurality of rules, and so forth.

In an example embodiment, based on the determination that the one or more equipment pieces do not meet the one or more rules, a weight may be assigned to a failure associated with the one or more equipment pieces. The weight may be assigned based on the total number of rules not met by the one or more equipment pieces.

In further example embodiments, weights may be assigned to the plurality of rules based on predetermined criteria. In this embodiment, the determination of whether the one or more rules are met by the plurality of equipment pieces may be based on the weights associated with the one or more rules. The predetermined criteria for assigning the weights to the plurality of rules may include one or more of the following: severity of a rule, a cost of repairing an equipment piece to meet a rule, time needed for fixing an operation of an equipment piece to meet a rule, key performance indicators (KPIs), and so forth.

The weights associated with the one or more rules broken by the one or more equipment pieces may be added up. Based on the summation of the weights, a failure rating associated with the one or more equipment pieces can be determined.

The analysis of the plurality of data points may further include determining a list of rules broken by the plurality of equipment pieces and/or determining a further list of rules broken by each equipment piece of the plurality of equipment pieces.

The analysis of the plurality of data points may further include determining a percentage of time the one or more equipment pieces do not meet the one or more rules during a total time the one or more equipment pieces met a criteria to comply with the one or more rules.

FIG. 3 is a schematic diagram showing a user interface 300 that visualizes an operation of a plurality of equipment pieces over a period of time, according to an example embodiment. The user interface 300 shows a table 305 that includes a plurality of columns. A first column of the table 305 shows names of devices (i.e., names of equipment pieces 310). The individual equipment pieces 310 may correspond to a room, a floor, and any other portion of a building.

The second column shows a weight 315 associated with each of the equipment pieces. The weight 315 may be assigned to a failure associated with the equipment piece based on a total number of rules not met by the equipment piece (a counting-based weight). For example, an equipment piece shown as device 1 may not meet three rules. Therefore, the weight 315 associated with the device 1 may be 3. Similarly, an equipment piece shown as device 3 may not meet two rules. Therefore, the weight 315 associated with the device 3 may be 2.

The next columns may be associated with rules selected as to be complied with by the equipment pieces 310. In an example embodiment, a rule 320 may include setting a predetermined setpoint for an airflow. The column associated with the rule 320 may show a percentage of time when an airflow does not meet a predetermined setpoint. A rule 325 may include setting a percentage of time a damper stuck open. The column associated with the rule 325 may show a percentage of time when the damper is stuck open. A rule 330 may include setting a percentage of time a damper stuck closed. The column associated with the rule 330 may show a percentage of time when the damper is stuck closed. A rule 340 may include setting a percentage of time a damper to be open for more than 90%. The column associated with the rule 340 may show a percentage of time when the damper is open for less than 90%. A rule 335 may include setting a minimum value of the airflow. The column associated with the rule 335 may show a percentage of time when the airflow is lower that the predetermined minimum value of the airflow.

Cells in columns associated with rules 315-340 may include an operational metric represented by the percentage of the time that an equipment piece broke a rule corresponding to the column out of the total time that the equipment piece met the criteria to run the rule (i.e., the total time that the equipment piece was set to comply with the rule).

The user interface 300 may act as an analysis report showing results of analyzing the operation of the equipment pieces 310. The analysis report may include a matrix represented by the table 305 that combines rules and equipment pieces to allow for analysis of the equipment pieces.

The user interface 300 may be provided to a user. The user may include an administrator of a building, an operator associated with system 200, and any other user that uses the system 200 to manage and maintain the building. The user may use the matrix represented by the table 305 to analyze the operation of the equipment pieces 310. For example, the user may determine which rules are not met by each equipment piece (an equipment piece analysis) and determine which equipment pieces do not meet a given rule (a rule analysis).

A weight may be a static value (1, 0.1, 5, and so forth) or a dynamic value generated based on predetermined formulas (for example, the average degrees above a setpoint when the rule is not met by the equipment piece). The weight may be assigned to a failure associated with the equipment piece based on a total number of rules not met by the equipment piece. This weight is shown as weight 315.

In some example embodiments, weights may be assigned to rules based on predetermined criteria. The predetermined criteria may include a severity of a rule, a cost of fixing an equipment piece to meet a rule, a time needed for fixing an operation of an equipment piece to meet a rule, KPIs, and so forth. For example, if the weight is based on the severity of a rule, a weight of 0.1 may be used for a rule that is notable but not severe; however, a weight of 5 may be used for a rule that requires attention. When the weight is based on the cost, the weight may be based on an average cost (e.g., $150) to troubleshoot or repair the equipment piece when the equipment piece does not meet the rule. When the weight is a labor-based weight, the weight may be based on an average time (e.g., 0.5 hours) of labor to troubleshoot the equipment piece when the equipment piece does not meet the rule. When the weight is based on a KPI, the weight may be based, for example, on a fact that a rule, on average, lowers tenant satisfaction by 5%.

The weights associated with rules not met by the equipment piece may be summed up. The summarized weight may show a failure rating associated with the equipment piece. The summarized weight may be analyzed by the user based on predetermined criteria. For example, in a counting-based approach, the summarized weight associated with an equipment piece may show that the equipment piece does not meet five rules. In a severity-based approach, the summarized weight may be used to determine that an equipment piece has a severity rating of 3.4. In terms of KPI meaning, the summarized weight may be used to determine that the operation of an equipment piece lowers tenant satisfaction by 18%. In terms of cost meaning, the summarized weight may be used to determine that it costs $1,020 to troubleshoot or repair an equipment piece.

The weights associated with equipment pieces and weights associated with rules may be used for purposes of ordering, sorting, and filtering. Specifically, the equipment pieces 310 may be sorted by the user. For example, the user may press a column name to sort the equipment pieces 310 based on parameters present in a column associated with the column name. The user interface 300 shows sorting the equipment pieces 310 based on the weight 315 so that the equipment pieces 310 that do not meet the largest number of rules are shown first.

Therefore, the user interface 300 enables an automatic sorting of the rows and columns by operational metric, for example, sorting of equipment pieces by a number of rules broken by the equipment pieces descending down the table, sorting rules left to right from equipment pieces that do not meet the higher number of rules to equipment pieces that do not meet less rules, resorting equipment pieces by weight when columns are hidden or shown, and so forth.

The user interface 300 further enables to ignore or exclude one or more equipment pieces from consideration for a given period of time. The ignored or excluded equipment pieces may disappear from equipment analysis shown in table 305.

The determination of whether an equipment piece does not meet the rule may be based on a predetermined threshold set for each of the rules. The threshold may include a static value, i.e., a constant threshold value, for example, 30%. In further embodiments, the threshold may include a dynamic statistical value or a value calculated based on predetermined formulas. For example, the dynamic statistical value may include an average value of all cells of a column associated with a rule plus one standard deviation of all cells for the rule.

The data points collected for the equipment piece are analyzed to determine whether the equipment piece meets the rules. If values associated with the data points exceed the threshold associated with rules, the cell associated with the rule shows the operational metric represented by the percentage of time the equipment piece does not meet the rule. If values associated with the data points do not exceed the threshold associated with rules, the cell may show zero percentage.

FIG. 4 is a schematic diagram showing a user interface 400 that visualizes an operation of a plurality of equipment pieces over a period of time, according to an example embodiment. The user interface 400 shows the table 305. The user may sort the equipment pieces 310 based on a specific rule. For example, the user may press a column name associated with the rule 335 to sort the equipment pieces 310 based on parameters associated with the rule 335. Upon sorting, the equipment pieces 310 that have the highest percentage of time when the equipment pieces 310 do not meet the rule 335 may be shown first. By sorting the equipment pieces 310 based on the rules, the equipment pieces 310 may be grouped or classified based on a specific rule. In particular, upon sorting, the user may see which equipment pieces 310 do not meet the rule 335. The equipment pieces 310 do not meet the rule 335 may be grouped into a group or a cluster.

In an example embodiment, a mitigation action to make the equipment pieces 310 to meet the rule 335 may be selected for a specific equipment piece 310 or for a group/cluster of equipment pieces 310 selected upon sorting the equipment pieces 310 that do not meet the rule 335.

FIG. 5 is a schematic diagram showing a user interface 500 that visualizes an operation of a plurality of equipment pieces over a period of time, according to an example embodiment. The user interface 500 shows the table 305. The user may select a specific rule for a specific equipment piece to show a chart associated with compliance of the specific equipment piece with the specific rule. For example, as shown in FIG. 5, the user may select a cell 505 in the table 305. The cell 505 may be associated with the rule 325 and the equipment piece 310 shown as device 1.

Figure 6:
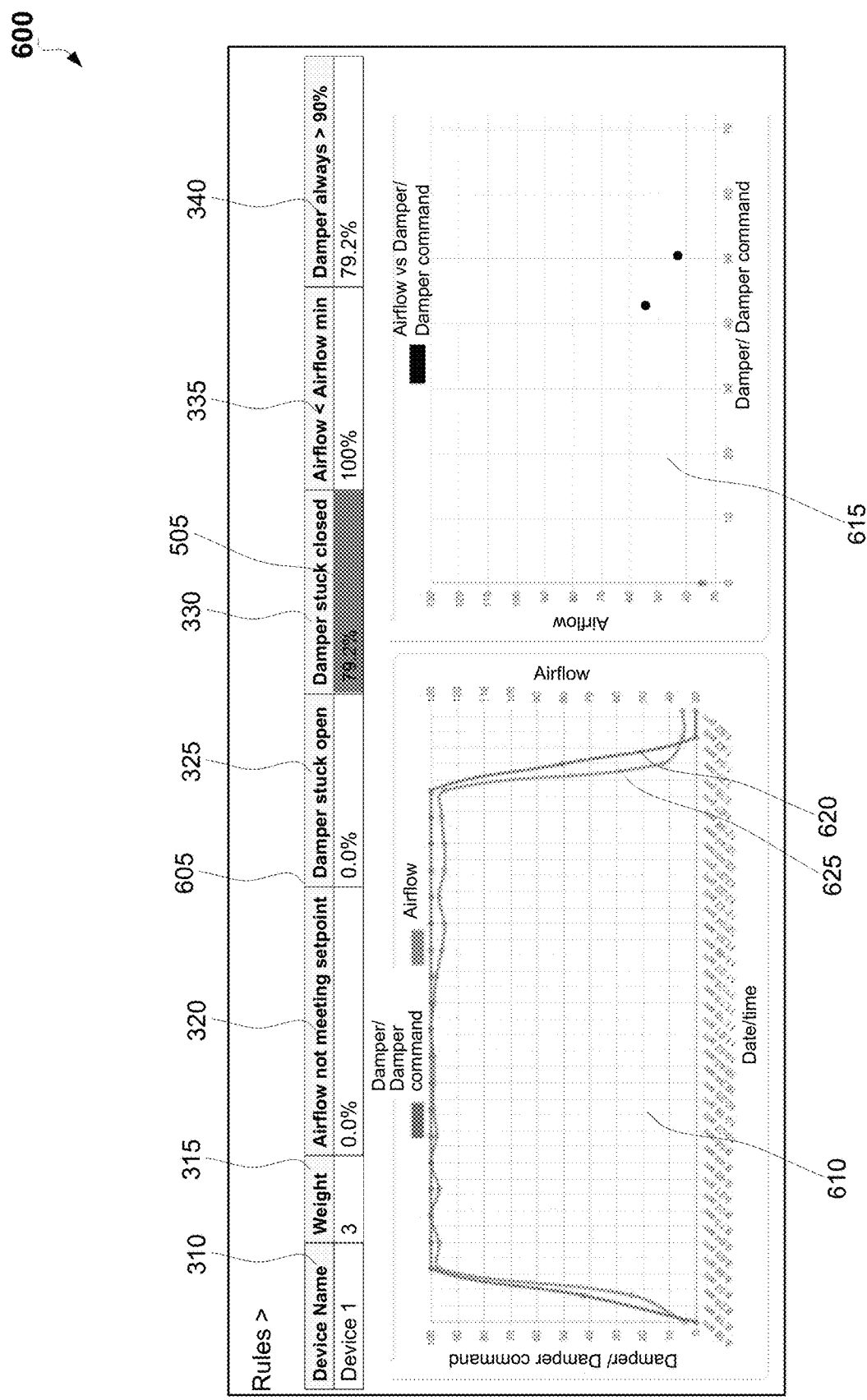
FIG. 6 is a schematic diagram showing a user interface that illustrates rules associated with an equipment piece, according to an example embodiment.

By selecting a given combination of an equipment piece and a rule (e.g., by selecting the cell 505), drill-down features associated with the equipment piece may be shown. Specifically, upon selection of the cell 505 by the user, a user interface 600 that visualizes an operation of an equipment piece 310 shown as device 1 over a period of time may be displayed. The user interface 600 is shown in FIG. 6.

The user interface 600 acts as the analysis report and provides a table 605 showing rules associated with the selected equipment piece 310. The user interface 600 further shows charts illustrating the operation of the equipment piece 310. Specifically, a chart 610 may show a damper command 620 given to a damper at specific data/time and an airflow 625 at the specific data/time. A chart 615 may show dependency of the airflow from the damper command.

A user may use the data shown on the user interface 600 to further understand the operation of the selected equipment piece 310, determine why the equipment piece 310 does not meet the rules, and change parameters of operation of the equipment piece 310 to make the equipment piece 310 to comply with the rules.

FIG. 7 illustrates a user interface 700 that shows formulas applied for setting rules for equipment pieces, according to an example embodiment. The user interface 700 shows a table 705 which includes columns representing a type 710 of an operator (a variable, a flag condition, precondition, and so forth), requirement 715 of the operator, name 720, formula 725, and note 730.

The formula 725 used for setting the rules may be characterized by a duality of the functional/object based formula (i.e., allowing both for sum(a, b) AND a.sum(b)).

In an example embodiment, multiple aliases may be allowed for functions (i.e., allowing all of count, length, and size to show the number of elements in an array, or allowing add and sum both to refer to the addition function).

The user interface 700 enables comparing, understanding, and coding in multiple programming language syntaxes. Specifically, the user interface 700 allows the user to code using syntax similar to that of Python, C#, Excel formulas, JavaScript, MatLAB, etc., or any combination of programming syntaxes and enables compiling the code into usable formulas.

Upon selecting variables and formulas associated with the rule (e.g., setting a setpoint for an airflow), the data points received from equipment pieces are analyzed. As soon as parameters set in formulas are satisfied, an alert may be generated and a mitigation action may be selected for particular equipment pieces that do not meet the rule. The formulas may be used in conjunction to determine whether the rule is met by the equipment pieces. Example formulas may include "HOUR(Date/Time)>=6 and HOUR(Date/Time)<20," "getPoint(Device," Airflow")," "ABS(Airflow-Airflow Setpoint)>150," "getPoint(Device," Airflow Setpoint")," "During work week? and HOUR(Date/Time)>=8 and <=17," "Weekday(Date/Time)>=1 and Weekday(Date/Time)<=5," "Date(Date/Time)," "Time(Date/Time)," "Hour (Date/Time)," and so forth.

FIG. 8 shows a user interface 800 that enables selection of equipment pieces, according to an example embodiment. All equipment pieces may be combined into an equipment tree 805. The user may search for and select particular equipment pieces in the equipment tree 805. For example, the user may select equipment pieces of logical equipment groupings (e.g., select all air handling units (AHU) on floor 3) and/or individual equipment selections (e.g., select AHU-1).

The user may also select a folder grouping the equipment pieces based on predetermined criteria. For example, the user may select "air handling unit 1" (the equipment pieces) or "AIR HANDLING UNIT 1" folder (the folder containing all child equipment pieces associated with the AHU).

The equipment pieces may be grouped based on an equipment type 810. The user may search for and select equipment pieces of a particular type (e.g., selecting all AHUs) based on the equipment type 810.

The equipment pieces may be grouped based on equipment components 815. The user may search for and select particular equipment components (e.g., select all temperature sensors) from a list showing the equipment components 815. The components may include, for example, a hydronic coil, a temperature sensor with setpoint, a fan with pressure sensors and setpoints, an entire AHU (including multiple components, such as fans, coolers, etc.), and so forth.

The user interface 800 may further show a number 820 of equipment pieces selected from a total number of equipment pieces based on the equipment tree 805/equipment type 810/equipment components 815.

The user interface 800 may also enable selection of data points of either specific equipment pieces (e.g., select all data points for "AHU 1") and/or selection of data points by a data point name (e.g., select all "space temperature" data points) and/or selection of data points by type (i.e., select all percentages).

FIG. 9 shows a user interface 900 illustrating translation of parameters for one or more equipment pieces into parameters of groups of equipment pieces or components of equipment pieces, according to an example embodiment.

The equipment pieces may have a plurality of component (e.g., a hydronic coil, a temperature sensor with a setpoint, a fan with pressure sensors and setpoints, an air handling unit that has a supply fan, a chilled water coil, etc.). The components may be characterized by data points, such as supply air temperature. The components may have subcomponents (for example, temperature sensors in a supply fan).

Data points associated with the components may be mapped to the data points associated with the sub-components. For example, the supply air temperature data point of the air handing unit component may be mapped to the temperature data point of the supply fan.

The user interface 900 shows a table 905 illustrating a profile of an air handing unit 910. In the profile, profile data points 915 associated with the air handing unit 910 may be set. The profile data points 915 may include supply air temperature, returning temperature, maximum temperature, and so forth.

In the profile, subprofile data points 920 associated with subcomponents of the air handing unit 910 may be set. The subcomponents may include fans, temperature sensors, and so forth. The subprofile data points 920 may include a setpoint for a temperature sensor, a fan profile, and the like.

Figure 10:
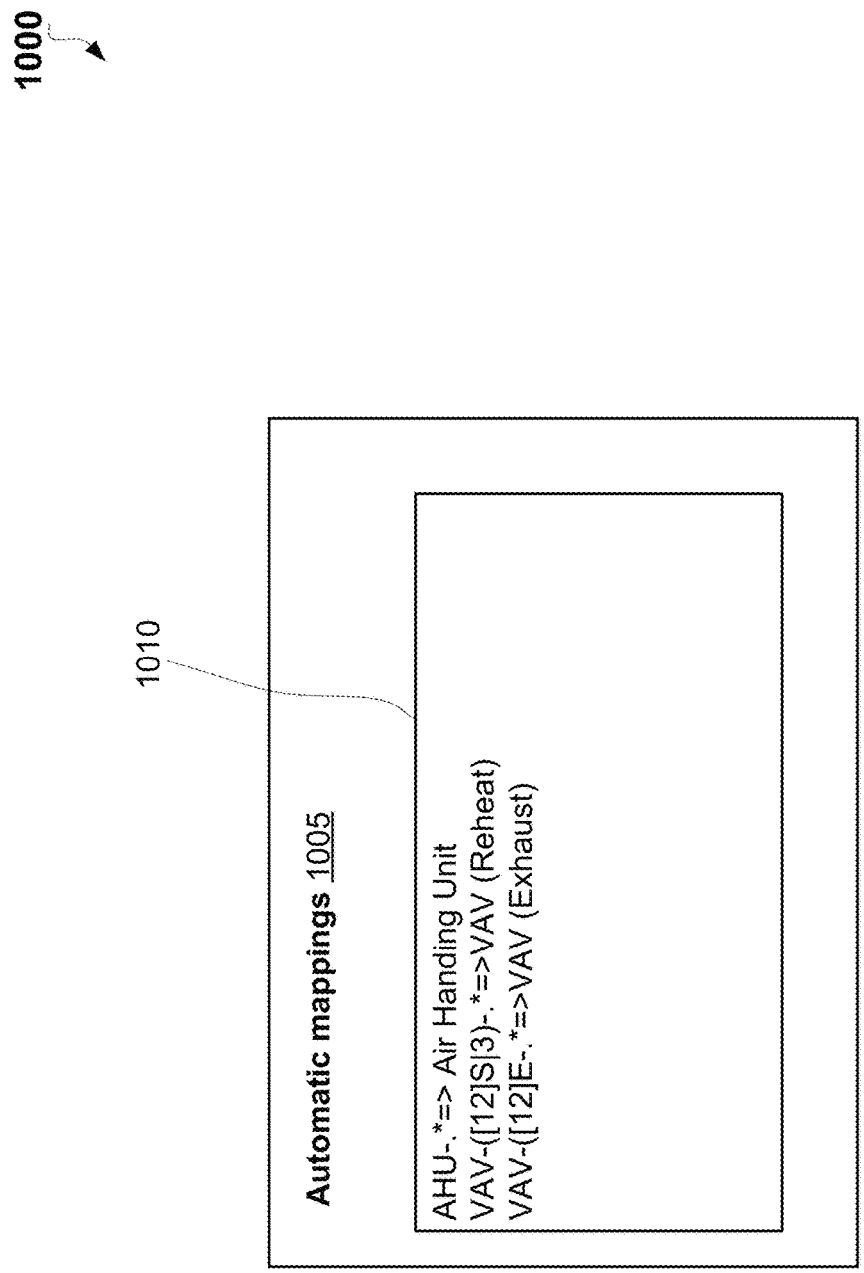
FIG. 10 is a schematic diagram showing a user interface that enables performing automatic mappings 1005 of equipment pieces, according to an example embodiment.

FIG. 10 shows a user interface 1000 that enables performing automatic mappings 1005 of equipment pieces, according to an example embodiment. The user interface 1000 may provide a text field 1010 for entering the rules by the user. For example, the automatic mapping rules may include mapping any equipment pieces, which have parameters that are identical or similar to parameters of an AHU, to be the AHU. In a further example embodiment, the automatic mapping rules may include mapping any variable air volume unit that has a first profile set by the user to be an exhaust variable air volume unit and mapping any variable air volume unit that has a second profile set by the user to be a reheat variable air volume unit. The user may perform mappings of equipment pieces for a plurality of purposes, such as assigning specific equipment pieces to a group of equipment pieces, assigning equipment pieces to be components of an equipment piece, creating hierarchy of the equipment pieces, mapping equipment piece to profiles, and so forth.

Therefore, the user may assign an equipment piece to another equipment piece by using text-based methods (i.e., by using regular expressions now). For example, variable air handing unit-1-3 is a child of air handing unit-1 because these devices share a floor number (1 in both cases) or air handing unit-3 (AHU-3) maps to Air Handling Unit component because the name of the air handing unit-3 starts with "AHU-."

In a further example embodiment, the translation associated with equipment pieces may be performed using a drag and drop function, multi-select function, bulk upload, and/or automapping behavior. The user may assign equipment pieces to components (i.e., match variable air volume unit-1-3 to the variable air volume unit component) or assign equipment data points to component points (i.e., match supply air temperature of AHU-1 to a supply air temperature point of the AHU component). Furthermore, the user may assign equipment pieces to parent equipment pieces (i.e., matching variable air volume unit-1-3 to AHU-1). The user may further assign equipment pieces to logical equipment groupings (i.e., assign variable air volume unit-3-4 to floor 3).

In an example embodiment, equipment pieces may be clustered into groups based on predetermined criteria (such as data point names, a floor, a type, and so forth). For example, the equipment pieces that have the same data point names may be clustered into a group. Specifically, all AHUs may be clustered into a group together because these equipment pieces share similar data point names.

The system 200 may be further configured to provide data parsing. In an example embodiment, a simplified user interface may be provided to the user to help the user build text-based analysis (such as regular expressions) to parse text files to convert the equipment operational data into a usable format (such as JSON).

Furthermore, the user may use user-editable named variables, with variable definitions (such as regular expressions) and complete or partial text replacements (e.g., replacing "AHU" with "AHU-" to convert "AHU1" into "AHU-1").

Figure 11:
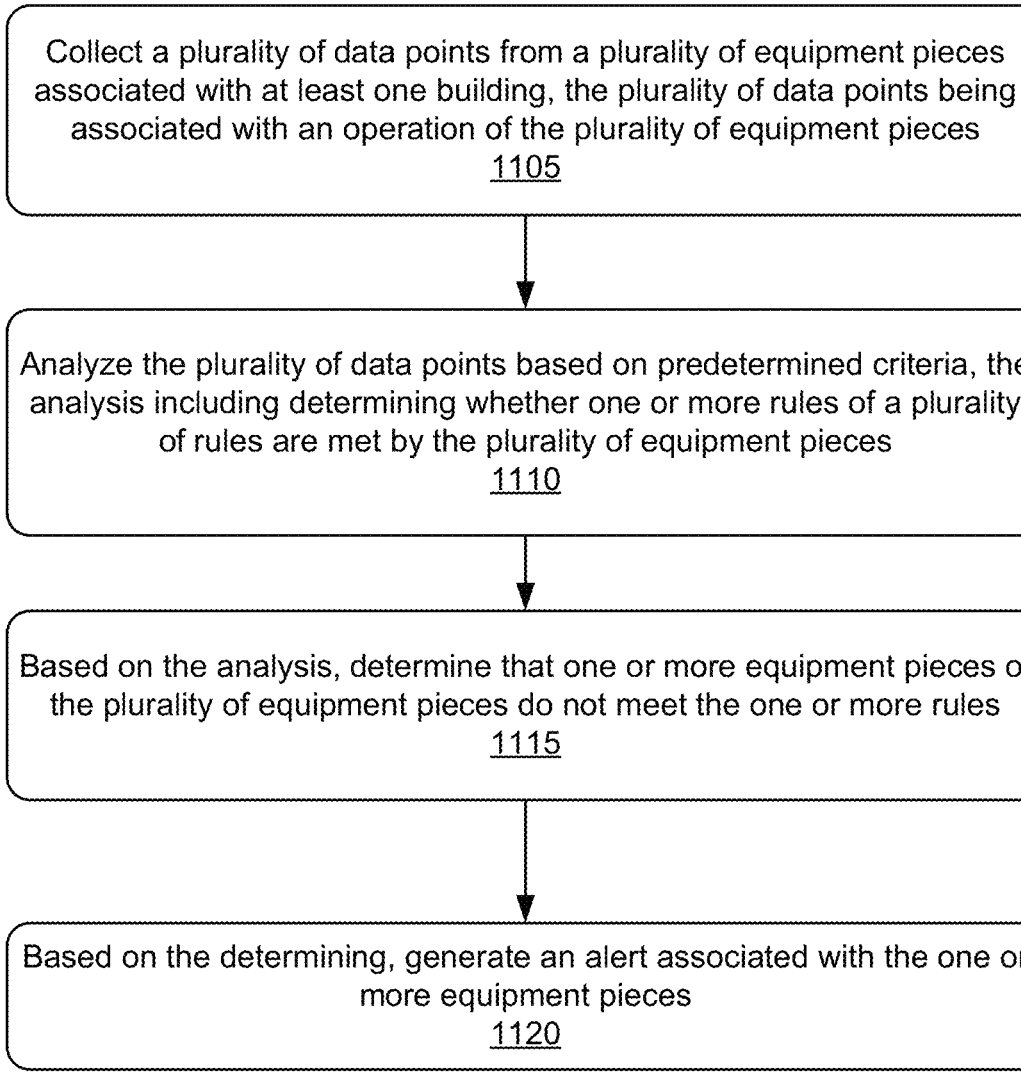
FIG. 11 is a flow chart showing a method for collecting and analyzing data for managing and maintaining buildings, according to an example embodiment.

FIG. 11 is a flow chart showing a method 1100 for collecting and analyzing data for managing and maintaining buildings, according to an example embodiment. The method 1100 may commence in block 1105 with collecting a plurality of data points from a plurality of equipment pieces associated with at least one building. The plurality of data points may be associated with an operation of the plurality of equipment pieces. The plurality of data points may be collected by receiving, at predetermined points of time, one or more text files that store data associated with an operation of the plurality of equipment pieces.

The method 1100 may continue in block 1110 with analyzing the plurality of data points based on predetermined criteria. The analysis may include determining whether one or more rules of a plurality of rules are met by the plurality of equipment pieces. The analysis of the plurality of data points may further include determining a list of rules broken by the plurality of equipment pieces. The analysis may further include determining, for an equipment piece of the plurality of equipment pieces, a further list of rules broken by the equipment piece. The analysis may further include determining a percentage of time when the one or more equipment pieces do not meet the one or more rules during a total time when the one or more equipment pieces met a criteria to comply with the one or more rules.

The method 1100 may further include determining, based on the analysis, that one or more equipment pieces of the plurality of equipment pieces do not meet the one or more rules in block 1115. The determination that the one or more equipment pieces of the plurality of equipment pieces do not meet the one or more rules may include determining that one or more of the data points associated with the one or more equipment pieces are below a predetermined threshold. In some embodiments, determination that the one or more equipment pieces of the plurality of equipment pieces do not meet the one or more rules may be based on historical data associated with the one or more equipment pieces.

The method 1100 may continue in block 1120 with generating an alert associated with the one or more equipment pieces based on the determination that the one or more equipment pieces of the plurality of equipment pieces do not meet the one or more rules. In an example embodiment, upon generation of the alert, a mitigation action to make the one or more equipment pieces meet the one or more rules may be selected. The method 1100 may further include generating an analysis report showing results of the analysis. The mitigation action to make the one or more equipment pieces meet the one or more rules may be selected based on the analysis report. The mitigation action may include, for example, operation parameters of the equipment pieces, repairing the equipment pieces, replacing the equipment pieces, and so forth.

In an example embodiment, the method 1100 may further include assigning, based on the determination that the one or more equipment pieces do not meet the one or more rules, a weight to a failure associated with the one or more equipment pieces. The weight may be assigned based on a total number of the one or more rules not met by the one or more equipment pieces.

The method 1100 may further include assigning weights to the plurality of rules based on predetermined criteria. The determination of whether the one or more rules are met by the plurality of equipment pieces may be based on the weights associated with the one or more rules. The predetermined criteria for the assigning the weights to the plurality of rules include one or more of the following: severity of a rule, a cost of fixing an equipment piece to meet a rule, a time needed for fixing an operation of an equipment piece to meet a rule, key performance indicators, and so forth. The method 1100 may further include summing up the weights associated with the one or more rules broken by the one or more equipment pieces. Based on the summed up weights, a failure rating associated with the one or more equipment pieces may be determined.

The method 1100 may further include visualizing an operation of the plurality of equipment pieces over a period of time. The visualizing may include showing operation parameters set for the plurality of equipment pieces and actual operation parameters associated with the plurality of equipment pieces. The actual operation parameters may be determined based on the data points collected at predetermined times during the period of time. The visualizing may further include showing a list of rules assigned to the one or more equipment pieces.

In an example embodiment, the method 1100 may further include mapping the plurality of equipment pieces. The mapping may include at least one of the following: assigning an equipment piece of the plurality of equipment pieces to an equipment component, assigning the data points associated with the equipment piece to the data points associated with the equipment component, assigning the equipment piece to a parent equipment piece, assigning the equipment piece to a logical equipment group, and so forth. The method 1100 may further include clustering the one or more equipment pieces based on predetermined criteria.

The method 1100 may further include enabling a user to create the plurality of rules, edit the plurality of rules, enable one or more of the plurality of rules, disable the one or more of the plurality of rules, delete the one or more of the plurality of rules, and so forth.

Figure 12:
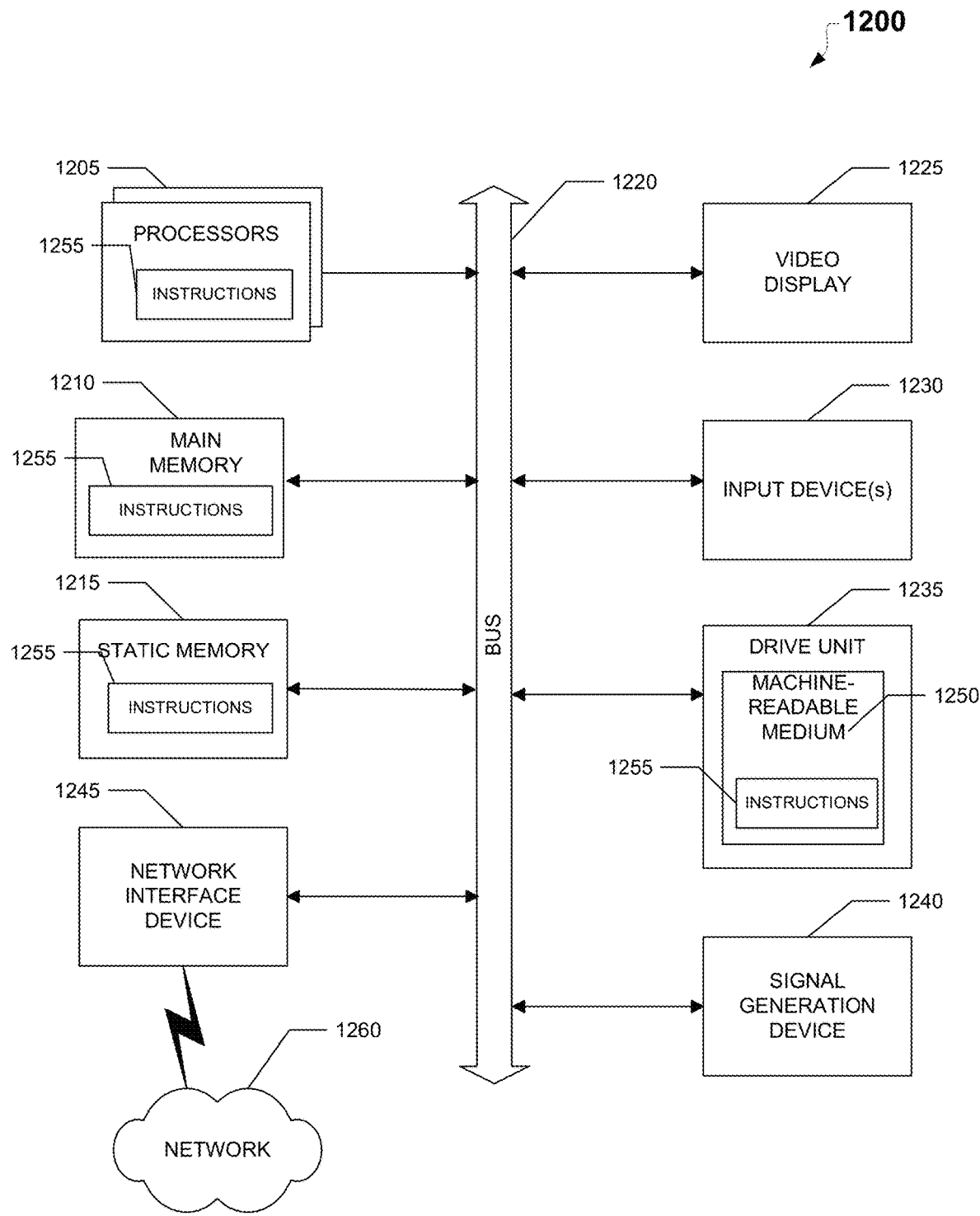
FIG. 12 is a high-level block diagram illustrating an example computer system, within which a set of instructions for causing the machine to perform any one or more of the methodologies discussed herein can be executed.

FIG. 12 shows a diagrammatic representation of a computing device or a machine in, for example, the electronic form of a computer system 1200, within which a set of instructions for causing the machine to perform any one or more of the methodologies discussed herein can be executed. In some embodiments, the machine operates as a standalone device, while in other embodiments it can be connected (e.g., networked) to other machines. In a networked deployment, the machine can operate in the capacity of a server, a client machine in a server-client network environment, or as a peer machine in a peer-to-peer (or distributed) network environment. The machine can be or comprise a personal computer (PC), tablet PC, cellular telephone, web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methods discussed herein.

In an illustrative embodiment, the computer system 1200 comprises at least one processor 1205 (e.g., a central processing unit, a graphics processing unit, and so on, singly or in combination), and a memory, which in this example comprises a main memory 1210 and a static memory 1215. The computer system 1200 may further comprise a video display 1225, a signal generation device 1240 (e.g., a speaker), and a network interface device 1245. In addition, the computer system 1200 may comprise at least one input device 1230, such as an alphanumeric input device (e.g., a keyboard), a cursor control device (e.g., a mouse), a microphone, a digital camera, and so forth. Communication among the components may be accomplished via a bus 1220. It will be apparent to one of ordinary skill in the art that the computer system 1200 can be implemented in a variety of ways; to give just one example, a speech processing system can be used in place of the video display 1225 and input device 1230.

A drive unit 1235 includes a computer-readable medium 1250, which stores one or more sets of instructions 1255 and data embodying or utilized by any one or more of the methods or functions described herein. The instructions 1255 can also reside, completely or at least partially, within the main memory 1210 and/or within the processors 1205 during execution thereof by the computer system 1200. The main memory 1210 and the processors 1205 also constitute machine-readable media.

The instructions 1255 can further be transmitted or received over a communications network 1260 via the network interface device 1245 utilizing any one of a number of well-known transfer protocols (e.g., Hyper Text Transfer Protocol, CAN, Serial, and Modbus). The communications network 1260 may include the Internet, local intranet, Personal Area Network, Local Area Network, Wide Area Network, Metropolitan Area Network, virtual private network, a cellular network, Bluetooth radio, or an IEEE 802.11-based radio frequency network, Wi-Fi™ network, and the like.

While the computer-readable medium 1250 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methods of the present application, or that is capable of storing, encoding, or carrying data utilized by or associated with such a set of instructions. The term "computer-readable medium" shall accordingly be taken to include, but not be limited to, solid-state memories and optical and magnetic media. Such media can also include, without limitation, hard disks, floppy disks, flash memory cards, digital video disks, random access memory, read only memory, and the like.

The example embodiments described herein can be implemented in an operating environment comprising computer-executable instructions installed on a computer, in software, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written utilizing any number of suitable programming languages such as, for example, HyperText Markup Language (HTML), Dynamic HTML, Extensible Markup Language, Extensible Stylesheet Language, Document Style Semantics and Specification Language, Cascading Style Sheets, Synchronized Multimedia Integration Language, Wireless Markup Language, Java™, Jini™, C, C++, C#, .NET, Adobe Flash, Perl, UNIX Shell, Visual Basic or Visual Basic Script, Virtual Reality Markup Language, ColdFusion™ Objective-C, Scala, Clojure, Python, JavaScript, HTML5 or other compilers, assemblers, interpreters, or other computer languages or platforms, as one of ordinary skill in the art will recognize.

Thus, methods of and systems for collecting and analyzing data for managing and maintaining buildings have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for collecting and analyzing data for managing and maintaining buildings, the method comprising:

receiving, by a computing device in communication with a network device operating in at least one building, a plurality of data points collected by the network device from a plurality of equipment pieces associated with the at least one building, the plurality of data points being associated with an operation of the plurality of equipment pieces;

providing, by the computing device, a user interface including:
    creating one or more rules of a plurality of rules by entering at least one condition based on the plurality of data points, the at least one condition indicating whether the one or more rules are met by the plurality of equipment pieces; and
    entering at least one precondition for triggering a check of the at least one condition;
analyzing, by the computing device, the plurality of data points based on predetermined criteria, the analysis including determining whether the one or more rules of the plurality of rules are met by the plurality of equipment pieces and determining a percentage of time an equipment piece of the plurality of equipment pieces does not meet a threshold associated with the one or more rules out of a total time the equipment piece meets the at least one precondition for triggering the check of the at least one condition;
based on the analysis, determining, by the computing device, that one or more equipment pieces of the plurality of equipment pieces do not meet the one or more rules;
based on the determining, generating, by the computing device, an alert associated with the one or more equipment pieces; and
based on the alert, selecting, by the computing device, a mitigation action to make the one or more equipment pieces meet the one or more rules.

2. The method of claim 1, further comprising:
based on the determining that the one or more equipment pieces do not meet the one or more rules, assigning, by the computing device, a weight indicating performance associated with the one or more equipment pieces, the weight being assigned based on a total number of the one or more rules not met by the one or more equipment pieces.

3. The method of claim 1, further comprising:
assigning, by the computing device, weights to the plurality of rules based on further predetermined criteria, wherein the determining whether the one or more rules are met by the plurality of equipment pieces is based on the weights associated with the one or more rules.

4. The method of claim 3, wherein the further predetermined criteria for the assigning the weights to the plurality of rules include one or more of the following: severity of a rule of the plurality of rules, a cost of fixing the equipment piece to meet the rule, a time needed for fixing an operation of the equipment piece to meet the rule, and key performance indicators.

5. The method of claim 3, further comprising:
aggregating, by the computing device, the weights associated with the one or more rules broken by the one or more equipment pieces; and
based on the aggregation of the weights, determining, by the computing device, a failure rating associated with the one or more equipment pieces.

6. The method of claim 1, further comprising:
visualizing, by the computing device, the operation of the plurality of equipment pieces over a period of time, the visualizing including showing set operation parameters associated with the plurality of equipment pieces and actual operation parameters associated with the plurality of equipment pieces, the actual operation parameters being determined based on the data points collected at predetermined times during the period of time.

7. The method of claim 6, wherein the visualizing further includes showing a list of rules assigned to the one or more equipment pieces.

8. The method of claim 1, wherein the analyzing the plurality of data points further includes at least one of the following:
    determining a list of rules of the plurality of rules broken by the plurality of equipment pieces; and
    determining, for the equipment piece of the plurality of equipment pieces, a further list of rules of the plurality of rules broken by the equipment piece.

9. The method of claim 1, further including:
visualizing, by the computing device, a table including a cell corresponding to the threshold and the equipment piece; and
displaying, by the computing device in the cell, one of the following:
    the percentage of time the equipment piece does not meet the threshold; and
    a zero value if the equipment piece meets the threshold.

10. The method of claim 1, further comprising mapping, by the computing device, the plurality of equipment pieces, the mapping including at least one of the following:
    assigning the equipment piece of the plurality of equipment pieces to an equipment component;
    assigning the data points associated with the equipment piece to the data points associated with the equipment component;
    assigning the equipment piece to a parent equipment piece; and
    assigning the equipment piece to a logical equipment group.

11. The method of claim 1, further comprising clustering, by the computing device, the one or more equipment pieces based on further predetermined criteria.

12. The method of claim 1, wherein the collecting the plurality of data points includes receiving one or more text files storing data associated with the operation of the plurality of equipment pieces at predetermined points of time.

13. The method of claim 1, wherein the determining that the one or more equipment pieces of the plurality of equipment pieces do not meet the one or more rules includes at least one of the following:
    determining that one or more of the data points associated with the one or more equipment pieces meet the predetermined criteria; and
    determining that the one or more equipment pieces of the plurality of equipment pieces do not meet the one or more rules based on historical data associated with the one or more equipment pieces.

14. A system for collecting and analyzing data for managing and maintaining buildings, the system comprising:
    a network device operating in at least one building and configured to collect a plurality of data points from a plurality of equipment pieces associated with the at least one building, the plurality of data points being associated with an operation of the plurality of equipment pieces;
    a computing device in communication with the network device, the computing device being configured to:
        provide a user interface including:
            a first option enabling a user to create one or more rules of a plurality of rules by entering at least one condition based on the plurality of data points, the at least one condition indicating whether the one or more rules are met by the plurality of equipment pieces; and a second option enabling the user to enter at least one precondition for triggering a check of the at least one condition;

analyze the plurality of data points based on predetermined criteria, the analysis including determining whether the one or more rules of the plurality of rules are met by the plurality of equipment pieces and determining a percentage of time an equipment piece of the plurality of equipment pieces does not meet a threshold associated with the one or more rules out of a total time the equipment piece meets the at least one precondition for triggering the check of the at least one condition; and based on the analysis, determine that one or more equipment pieces of the plurality of equipment pieces do not meet the one or more rules; and generate, based on the determining, an alert associated with the one or more equipment pieces;

select a mitigation action to make the one or more equipment pieces meet the one or more rules.

15. The system of claim 14, wherein the computing device is configured to visualize the operation of the plurality of equipment pieces over a period of time, the visualizing including showing set operation parameters associated with the plurality of equipment pieces and actual operation parameters associated with the plurality of equipment pieces, the actual operation parameters being determined based on the data points collected at predetermined times during the period of time.

16. The system of claim 14, wherein the computing device is further configured to:

generate an analysis report showing results of the analysis; and wherein the mitigation action is selected based on the analysis.

17. The system of claim 14, wherein the computing device is further configured to map the plurality of equipment pieces, the mapping including at least one of the following:

assigning the equipment piece of the plurality of equipment pieces to an equipment component;

assigning the data points associated with the equipment piece to the data points associated with the equipment component;

assigning the equipment piece to a parent equipment piece; and assigning the equipment piece to a logical equipment group.

18. The system of claim 14, wherein the user interface enables the user to edit the plurality of rules, enable one or more of the plurality of rules, disable the one or more of the plurality of rules, and delete the one or more of the plurality of rules.

19. A system for collecting and analyzing data for managing and maintaining buildings, the system comprising:

a network device operating in at least one building, the network device being configured to collect a plurality of data points from a plurality of equipment pieces associated with the at least one building, the plurality of data points being associated with an operation of the plurality of equipment pieces; and a computing device in communication with the network device, the computing device being configured to receive the plurality of data points as one or more text files storing data associated with the operation of the plurality of equipment pieces at predetermined points of time;

provide a user interface including:
a first option enabling a user to:
create one or more rules of a plurality of rules by entering at least one condition based on the plurality of data points, the at least one condition indicating whether the one or more rules are met by the plurality of equipment pieces;
edit the plurality of rules;
enable one or more of the plurality of rules;
disable the one or more of the plurality of rules; and
delete the one or more of the plurality of rules; and
a second option enabling the user to enter at least one precondition for triggering a check of at least one condition;

analyze the plurality of data points based on predetermined criteria, the analysis including determining whether the one or more rules of the plurality of rules are met by the plurality of equipment pieces and determining a percentage of time an equipment piece of the plurality of equipment pieces does not meet a threshold associated with the one or more rules out of a total time the equipment piece meets the at least one precondition for triggering the check of the at least one condition;

based on the analysis, determine that one or more equipment pieces of the plurality of equipment pieces do not meet the one or more rules;

generate, based on the determining, an alert associated with the one or more equipment pieces;

select, based on the alert, a mitigation action to make the one or more equipment pieces meet the one or more rules; and visualize the operation of the plurality of equipment pieces over a period of time, the visualizing including showing set operation parameters associated with the plurality of equipment pieces and actual operation parameters associated with the plurality of equipment pieces, the actual operation parameters being determined based on the data points collected at predetermined times during the period of time.

* * * * *